United States Patent
Hooper et al.

(10) Patent No.: US 7,433,307 B2
(45) Date of Patent: Oct. 7, 2008

(54) FLOW CONTROL IN A NETWORK ENVIRONMENT

(75) Inventors: Donald F. Hooper, Shrewsbury, MA (US); Myles J. Wilde, Charlestown, MA (US); Matthew J. Adiletta, Worcester, MA (US); Gilbert Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 1067 days.

(21) Appl. No.: 10/290,040

(22) Filed: Nov. 5, 2002

(65) Prior Publication Data

US 2004/0085901 A1    May 6, 2004

(51) Int. Cl.
*G01R 31/08* (2006.01)
(52) U.S. Cl. .................. 370/231; 370/236
(58) Field of Classification Search .......... None
See application file for complete search history.

(56) References Cited

U.S. PATENT DOCUMENTS

| | | | |
|---|---|---|---|
| 3,373,408 A | 3/1968 | Ling | |
| 3,478,322 A | 11/1969 | Evans | |
| 3,623,001 A | 11/1971 | Kleist et al. | |
| 3,736,566 A | 5/1973 | Anderson et al. | |
| 3,792,441 A | 2/1974 | Wymore et al. | |
| 3,889,243 A | 6/1975 | Drimak | |
| 3,940,745 A | 2/1976 | Sajeva | |
| 4,016,548 A | 4/1977 | Law et al. | |
| 4,032,899 A | 6/1977 | Jenny et al. | |
| 4,075,691 A | 2/1978 | Davis et al. | |
| 4,130,890 A | 12/1978 | Adam | |
| 4,400,770 A | 8/1983 | Chan et al. | |
| 4,514,807 A | 4/1985 | Nogi | |
| 4,523,272 A | 6/1985 | Fukunaga et al. | |
| 4,658,351 A | 4/1987 | Teng | |
| 4,709,347 A | 11/1987 | Kirk | |
| 4,745,544 A | 5/1988 | Renner et al. | |
| 4,788,640 A | 11/1988 | Hansen | |
| 4,831,358 A | 5/1989 | Ferrio et al. | |
| 4,858,108 A | 8/1989 | Ogawa et al. | |
| 4,866,664 A | 9/1989 | Burkhardt, Jr. et al. | |
| 4,890,218 A | 12/1989 | Bram | |
| 4,890,222 A | 12/1989 | Kirk | |

(Continued)

FOREIGN PATENT DOCUMENTS

EP    0 379 709    8/1990

(Continued)

OTHER PUBLICATIONS

Vuppala, V., et al., "Layer-3 Switching Using Virtual Network Ports", *Computer Communications and Networks 1999. Proc. 8th International Conf.*, Boston, MA, USA, Oct. 11-13, 1999, pp. 642-648.

(Continued)

*Primary Examiner*—Robert W Wilson
(74) *Attorney, Agent, or Firm*—Fish & Richardson P.C.

(57) ABSTRACT

Providing flow control includes receiving at a router an indication of the ability of each one of multiple ports not directly connected to the router to receive data from the router and controlling transmission of data from the router to the multiple ports based at least on the indication.

52 Claims, 5 Drawing Sheets

U.S. PATENT DOCUMENTS

| | | |
|---|---|---|
| 4,991,112 A | 2/1991 | Callemyn |
| 5,115,507 A | 5/1992 | Callemyn |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,251,205 A | 10/1993 | Callon et al. |
| 5,255,239 A | 10/1993 | Taborn et al. |
| 5,263,169 A | 11/1993 | Genusov et al. |
| 5,313,454 A | 5/1994 | Bustini et al. |
| 5,347,648 A | 9/1994 | Stamm et al. |
| 5,367,678 A | 11/1994 | Lee et al. |
| 5,379,295 A | 1/1995 | Yonehara |
| 5,379,432 A | 1/1995 | Orton et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,469 A | 4/1995 | Chung et al. |
| 5,404,482 A | 4/1995 | Stamm et al. |
| 5,432,918 A | 7/1995 | Stamm |
| 5,448,702 A | 9/1995 | Garcia, Jr. et al. |
| 5,450,351 A | 9/1995 | Heddes |
| 5,452,437 A | 9/1995 | Richey et al. |
| 5,452,452 A | 9/1995 | Gaetner et al. |
| 5,459,842 A | 10/1995 | Begun et al. |
| 5,459,843 A | 10/1995 | Davis et al. |
| 5,463,625 A | 10/1995 | Yasrebi |
| 5,467,452 A | 11/1995 | Blum et al. |
| 5,475,856 A | 12/1995 | Kogge |
| 5,485,455 A | 1/1996 | Dobbins et al. |
| 5,515,296 A | 5/1996 | Agarwal |
| 5,517,648 A | 5/1996 | Bertone et al. |
| 5,539,737 A | 7/1996 | Lo et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,476 A | 10/1996 | Sherer et al. |
| 5,568,617 A | 10/1996 | Kametani |
| 5,574,922 A | 11/1996 | James |
| 5,581,729 A | 12/1996 | Nistala et al. |
| 5,592,622 A | 1/1997 | Isfeld et al. |
| 5,613,071 A | 3/1997 | Rankin et al. |
| 5,613,136 A | 3/1997 | Casavant et al. |
| 5,617,327 A | 4/1997 | Duncan |
| 5,623,489 A | 4/1997 | Cotton et al. |
| 5,627,829 A | 5/1997 | Gleeson et al. |
| 5,630,074 A | 5/1997 | Beltran |
| 5,630,130 A | 5/1997 | Perotto et al. |
| 5,633,865 A | 5/1997 | Short |
| 5,644,623 A | 7/1997 | Gulledge |
| 5,649,110 A | 7/1997 | Ben-Nun et al. |
| 5,649,157 A | 7/1997 | Williams |
| 5,651,002 A | 7/1997 | Van Seters et al. |
| 5,659,687 A | 8/1997 | Kim et al. |
| 5,680,641 A | 10/1997 | Sidman |
| 5,689,566 A | 11/1997 | Nguyen |
| 5,692,126 A * | 11/1997 | Templeton et al. .......... 709/249 |
| 5,699,537 A | 12/1997 | Sharangpani et al. |
| 5,701,434 A | 12/1997 | Nakagawa |
| 5,717,898 A | 2/1998 | Kagan et al. |
| 5,721,870 A | 2/1998 | Matsumoto |
| 5,724,574 A | 3/1998 | Stratigos et al. |
| 5,740,402 A | 4/1998 | Bratt et al. |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,754,764 A | 5/1998 | Davis et al. |
| 5,761,507 A | 6/1998 | Govett |
| 5,761,522 A | 6/1998 | Hisanaga et al. |
| 5,764,915 A | 6/1998 | Heimsoth et al. |
| 5,768,528 A | 6/1998 | Stumm |
| 5,781,551 A | 7/1998 | Born |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,805,816 A | 9/1998 | Picazo, Jr. et al. |
| 5,809,235 A | 9/1998 | Sharma et al. |
| 5,809,237 A | 9/1998 | Watts et al. |
| 5,809,530 A | 9/1998 | Samra et al. |
| 5,812,868 A | 9/1998 | Moyer et al. |
| 5,828,746 A | 10/1998 | Ardon |
| 5,828,863 A | 10/1998 | Barrett et al. |
| 5,828,881 A | 10/1998 | Wang |
| 5,828,901 A | 10/1998 | O'Toole et al. |
| 5,832,215 A | 11/1998 | Kato et al. |
| 5,835,755 A | 11/1998 | Stellwagen, Jr. |
| 5,838,988 A | 11/1998 | Panwar et al. |
| 5,850,399 A | 12/1998 | Ganmukhi et al. |
| 5,850,530 A | 12/1998 | Chen et al. |
| 5,854,922 A | 12/1998 | Gravenstein et al. |
| 5,857,188 A * | 1/1999 | Douglas ...................... 707/9 |
| 5,860,138 A | 1/1999 | Engebretsen et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,898,686 A | 4/1999 | Virgile |
| 5,898,701 A | 4/1999 | Johnson |
| 5,905,876 A | 5/1999 | Pawlowski et al. |
| 5,905,889 A | 5/1999 | Wilhelm, Jr. |
| 5,909,686 A | 6/1999 | Muller et al. |
| 5,915,123 A | 6/1999 | Mirsky et al. |
| 5,918,235 A | 6/1999 | Kirshenbaum et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,953,336 A | 9/1999 | Moore et al. |
| 5,958,031 A | 9/1999 | Kim |
| 5,961,628 A | 10/1999 | Nguyen et al. |
| 5,968,169 A | 10/1999 | Pickett |
| 5,970,013 A | 10/1999 | Fischer et al. |
| 5,974,518 A | 10/1999 | Nogradi |
| 5,978,838 A | 11/1999 | Mohamed et al. |
| 5,983,274 A | 11/1999 | Hyder et al. |
| 5,995,513 A | 11/1999 | Harrand et al. |
| 6,012,151 A | 1/2000 | Mano |
| 6,014,729 A | 1/2000 | Lannan et al. |
| 6,023,742 A | 2/2000 | Ebeling et al. |
| 6,032,190 A | 2/2000 | Bremer et al. |
| 6,032,218 A | 2/2000 | Lewin et al. |
| 6,047,002 A | 4/2000 | Hartmann et al. |
| 6,049,867 A | 4/2000 | Eickemeyer et al. |
| 6,058,168 A | 5/2000 | Braband |
| 6,061,710 A | 5/2000 | Eickemeyer et al. |
| 6,067,300 A | 5/2000 | Baumert et al. |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |

| Patent | Date | Inventor |
|---|---|---|
| 6,079,008 A | 6/2000 | Clery, III |
| 6,085,215 A | 7/2000 | Ramakrishnan et al. |
| 6,085,248 A | 7/2000 | Sambamurthy et al. |
| 6,085,294 A | 7/2000 | Van Doren et al. |
| 6,092,127 A | 7/2000 | Tausheck |
| 6,092,158 A | 7/2000 | Harriman et al. |
| 6,104,700 A | 8/2000 | Haddock et al. |
| 6,111,886 A | 8/2000 | Stewart |
| 6,112,016 A | 8/2000 | MacWilliams et al. |
| 6,122,251 A * | 9/2000 | Shinohara .................. 370/231 |
| 6,128,669 A | 10/2000 | Moriarty et al. |
| 6,134,665 A | 10/2000 | Klein et al. |
| 6,141,677 A | 10/2000 | Hanif et al. |
| 6,141,689 A | 10/2000 | Yasrebi |
| 6,141,765 A | 10/2000 | Sherman |
| 6,144,669 A | 11/2000 | Williams et al. |
| 6,145,054 A | 11/2000 | Mehrotra et al. |
| 6,157,955 A | 12/2000 | Narad et al. |
| 6,160,562 A | 12/2000 | Chin et al. |
| 6,170,051 B1 | 1/2001 | Dowling |
| 6,175,927 B1 * | 1/2001 | Cromer et al. ............... 713/300 |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,544 B1 | 4/2001 | Borkenhagen et al. |
| 6,212,604 B1 | 4/2001 | Tremblay |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,243 B1 | 4/2001 | Ueda et al. |
| 6,223,274 B1 | 4/2001 | Catthoor et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,269,391 B1 | 7/2001 | Gillespie |
| 6,272,109 B1 | 8/2001 | Pei et al. |
| 6,272,520 B1 | 8/2001 | Sharangpani et al. |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,282,169 B1 | 8/2001 | Kiremidjian |
| 6,286,083 B1 | 9/2001 | Chin et al. |
| 6,289,011 B1 | 9/2001 | Seo et al. |
| 6,295,600 B1 | 9/2001 | Parady |
| 6,298,370 B1 | 10/2001 | Tang et al. |
| 6,307,789 B1 | 10/2001 | Wolrich et al. |
| 6,311,261 B1 | 10/2001 | Chamdani et al. |
| 6,320,861 B1 | 11/2001 | Adam et al. |
| 6,324,624 B1 | 11/2001 | Wolrich et al. |
| 6,335,932 B2 | 1/2002 | Kadambi et al. |
| 6,338,078 B1 | 1/2002 | Chang et al. |
| 6,345,334 B1 | 2/2002 | Nakagawa et al. |
| 6,347,344 B1 | 2/2002 | Baker et al. |
| 6,349,331 B1 | 2/2002 | Andra et al. |
| 6,356,962 B1 | 3/2002 | Kasper et al. |
| 6,359,911 B1 | 3/2002 | Movshovich et al. |
| 6,360,262 B1 | 3/2002 | Guenthner et al. |
| 6,360,277 B1 | 3/2002 | Ruckley et al. |
| 6,366,998 B1 | 4/2002 | Mohamed |
| 6,373,848 B1 | 4/2002 | Allison et al. |
| 6,377,998 B2 | 4/2002 | Noll et al. |
| 6,389,031 B1 | 5/2002 | Chao et al. |
| 6,389,449 B1 | 5/2002 | Nemirovsky et al. |
| 6,393,026 B1 | 5/2002 | Irwin |
| 6,393,483 B1 | 5/2002 | Latif et al. |
| 6,404,737 B1 | 6/2002 | Novik et al. |
| 6,415,338 B1 | 7/2002 | Habot |
| 6,418,488 B1 | 7/2002 | Chilton et al. |
| 6,424,657 B1 | 7/2002 | Voit et al. |
| 6,424,659 B2 | 7/2002 | Viswanadham et al. |
| 6,426,940 B1 | 7/2002 | Seo et al. |
| 6,426,943 B1 | 7/2002 | Spinney et al. |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,438,132 B1 | 8/2002 | Vincent et al. |
| 6,438,134 B1 | 8/2002 | Chow et al. |
| 6,448,812 B1 | 9/2002 | Bacigalupo |
| 6,453,404 B1 | 9/2002 | Bereznyi et al. |
| 6,457,015 B1 | 9/2002 | Eastham |
| 6,463,035 B1 * | 10/2002 | Moore ........................ 370/236 |
| 6,463,072 B1 | 10/2002 | Wolrich et al. |
| 6,463,480 B2 | 10/2002 | Kikuchi et al. |
| 6,463,527 B1 | 10/2002 | Vishkin |
| 6,466,898 B1 | 10/2002 | Chan |
| 6,477,562 B2 | 11/2002 | Nemirovsky et al. |
| 6,484,224 B1 | 11/2002 | Robins et al. |
| 6,501,731 B1 | 12/2002 | Chong et al. |
| 6,507,862 B1 | 1/2003 | Joy et al. |
| 6,522,188 B1 | 2/2003 | Poole |
| 6,526,451 B2 | 2/2003 | Kasper |
| 6,526,452 B1 | 2/2003 | Petersen et al. |
| 6,529,983 B1 | 3/2003 | Marshall et al. |
| 6,532,509 B1 | 3/2003 | Wolrich et al. |
| 6,535,878 B1 | 3/2003 | Guedalia et al. |
| 6,552,826 B2 | 4/2003 | Adler et al. |
| 6,553,406 B1 | 4/2003 | Berger et al. |
| 6,560,667 B1 | 5/2003 | Wolrich et al. |
| 6,570,850 B1 | 5/2003 | Gutierrez et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,604,125 B1 | 8/2003 | Belkin |
| 6,606,704 B1 | 8/2003 | Adiletta et al. |
| 6,625,654 B1 | 9/2003 | Wolrich et al. |
| 6,628,668 B1 | 9/2003 | Hutzli et al. |
| 6,629,147 B1 | 9/2003 | Grow |
| 6,629,236 B1 | 9/2003 | Aipperspach et al. |
| 6,631,422 B1 | 10/2003 | Althaus et al. |
| 6,631,430 B1 | 10/2003 | Wolrich et al. |
| 6,631,462 B1 | 10/2003 | Wolrich et al. |
| 6,657,963 B1 * | 12/2003 | Paquette et al. ............. 370/236 |
| 6,658,551 B1 | 12/2003 | Berenbaum et al. |
| 6,661,774 B1 | 12/2003 | Lauffenburger et al. |
| 6,661,794 B1 | 12/2003 | Wolrich et al. |
| 6,665,699 B1 | 12/2003 | Hunter et al. |
| 6,665,755 B2 | 12/2003 | Modelski et al. |
| 6,667,920 B2 | 12/2003 | Wolrich et al. |
| 6,668,317 B1 | 12/2003 | Bernstein et al. |
| 6,671,827 B2 | 12/2003 | Guilford et al. |
| 6,675,190 B1 | 1/2004 | Schabernack et al. |
| 6,675,192 B2 | 1/2004 | Emer et al. |
| 6,678,746 B1 | 1/2004 | Russell et al. |
| 6,680,933 B1 | 1/2004 | Cheesman et al. |
| 6,681,300 B2 | 1/2004 | Wolrich et al. |
| 6,684,326 B1 | 1/2004 | Cromer et al. |
| 6,694,380 B1 | 2/2004 | Wolrich et al. |
| 6,697,379 B1 | 2/2004 | Jacquet et al. |
| 6,721,325 B1 | 4/2004 | Duckering et al. |
| 6,724,767 B1 | 4/2004 | Chong et al. |
| 6,728,845 B2 | 4/2004 | Adiletta et al. |
| 6,732,187 B1 * | 5/2004 | Lougheed et al. ........... 709/245 |
| 6,754,211 B1 | 6/2004 | Brown |
| 6,754,222 B1 | 6/2004 | Joung et al. |
| 6,768,717 B1 | 7/2004 | Reynolds et al. |
| 6,775,284 B1 | 8/2004 | Calvignac et al. |
| 6,792,488 B2 | 9/2004 | Wolrich et al. |
| 6,798,744 B1 * | 9/2004 | Loewen et al. ............... 370/235 |
| 6,826,615 B2 | 11/2004 | Barrall et al. |
| 6,834,053 B1 | 12/2004 | Stacey et al. |
| 6,850,521 B1 | 2/2005 | Kadambi et al. |
| 6,856,622 B1 | 2/2005 | Calamvokis et al. |
| 6,873,618 B1 | 3/2005 | Weaver |

| | | |
|---|---|---|
| 6,876,561 B2 | 4/2005 | Wolrich et al. |
| 6,895,457 B2 | 5/2005 | Wolrich et al. |
| 6,925,637 B2 | 8/2005 | Thomas et al. |
| 6,931,641 B1 | 8/2005 | Davis et al. |
| 6,934,780 B2 | 8/2005 | Modelski et al. |
| 6,934,951 B2 | 8/2005 | Wilkinson et al. |
| 6,938,147 B1 | 8/2005 | Joy et al. |
| 6,944,850 B2 | 9/2005 | Hooper et al. |
| 6,947,425 B1 | 9/2005 | Hooper et al. |
| 6,952,824 B1 | 10/2005 | Hooper et al. |
| 6,959,002 B2 | 10/2005 | Wynne et al. |
| 6,967,963 B1 | 11/2005 | Houh et al. |
| 6,976,095 B1 | 12/2005 | Wolrich et al. |
| 6,981,077 B2 | 12/2005 | Modelski et al. |
| 6,983,350 B1 | 1/2006 | Wheeler et al. |
| 7,006,495 B2 | 2/2006 | Hooper |
| 7,065,569 B2 | 6/2006 | Teraslinna |
| 7,069,548 B2 | 6/2006 | Kushlis |
| 7,096,277 B2 | 8/2006 | Hooper |
| 7,100,102 B2 | 8/2006 | Hooper et al. |
| 7,111,296 B2 | 9/2006 | Wolrich et al. |
| 7,124,196 B2 | 10/2006 | Hooper |
| 7,126,952 B2 | 10/2006 | Hooper et al. |
| 7,149,786 B1 | 12/2006 | Bohringer et al. |
| 7,181,742 B2 | 2/2007 | Hooper |
| 7,191,321 B2 | 3/2007 | Bernstein et al. |
| 7,206,858 B2 | 4/2007 | Hooper et al. |
| 7,248,584 B2 | 7/2007 | Hooper |
| 7,305,500 B2 | 12/2007 | Adiletta et al. |
| 7,328,289 B2 | 2/2008 | Wolrich et al. |
| 7,352,769 B2 | 4/2008 | Hooper et al. |
| 2001/0023487 A1 | 9/2001 | Kawamoto |
| 2002/0027448 A1 | 3/2002 | Bacigalupo |
| 2002/0041520 A1 | 4/2002 | Wolrich et al. |
| 2002/0075878 A1 | 6/2002 | Lee et al. |
| 2002/0118692 A1 | 8/2002 | Oberman et al. |
| 2002/0150047 A1 | 10/2002 | Knight et al. |
| 2002/0181194 A1* | 12/2002 | Ho et al. ............... 361/684 |
| 2003/0043803 A1 | 3/2003 | Hooper |
| 2003/0067934 A1 | 4/2003 | Hooper et al. |
| 2003/0086434 A1* | 5/2003 | Kloth ................ 370/419 |
| 2003/0105901 A1 | 6/2003 | Wolrich et al. |
| 2003/0105917 A1* | 6/2003 | Ostler et al. ............ 711/110 |
| 2003/0110166 A1 | 6/2003 | Wolrich et al. |
| 2003/0115347 A1 | 6/2003 | Wolrich et al. |
| 2003/0115426 A1 | 6/2003 | Rosenbluth et al. |
| 2003/0131198 A1 | 7/2003 | Wolrich et al. |
| 2003/0140196 A1 | 7/2003 | Wolrich et al. |
| 2003/0145159 A1 | 7/2003 | Adiletta et al. |
| 2003/0147409 A1 | 8/2003 | Wolrich et al. |
| 2003/0161303 A1 | 8/2003 | Mehrvar et al. |
| 2003/0161337 A1 | 8/2003 | Weinman |
| 2003/0196012 A1 | 10/2003 | Wolrich et al. |
| 2003/0210574 A1 | 11/2003 | Wolrich et al. |
| 2003/0231635 A1 | 12/2003 | Kalkunte et al. |
| 2004/0039895 A1 | 2/2004 | Wolrich et al. |
| 2004/0052269 A1 | 3/2004 | Hooper et al. |
| 2004/0054880 A1 | 3/2004 | Bernstein et al. |
| 2004/0059828 A1 | 3/2004 | Hooper et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0148382 A1 | 7/2004 | Narad et al. |
| 2004/0162933 A1 | 8/2004 | Adiletta et al. |
| 2004/0252686 A1 | 12/2004 | Hooper et al. |
| 2005/0033884 A1 | 2/2005 | Wolrich et al. |
| 2005/0149665 A1 | 7/2005 | Wolrich et al. |
| 2006/0007871 A1 | 1/2006 | Welin |
| 2006/0069882 A1 | 3/2006 | Wheeler et al. |
| 2006/0156303 A1 | 7/2006 | Hooper et al. |

FOREIGN PATENT DOCUMENTS

| | | |
|---|---|---|
| EP | 0 464 715 | 1/1992 |
| EP | 0 633 678 | 1/1995 |
| EP | 0 745 933 | 12/1996 |
| EP | 0 773 648 | 5/1997 |
| EP | 0 809 180 | 11/1997 |
| EP | 0 959 602 | 11/1999 |
| JP | 59-111533 | 6/1984 |
| WO | WO 94/15287 | 7/1994 |
| WO | WO 97/38372 | 10/1997 |
| WO | WO 98/20647 | 5/1998 |
| WO | WO 00/38376 | 6/2000 |
| WO | WO 00/56024 | 9/2000 |
| WO | WO 01/16718 | 3/2001 |
| WO | WO 01/16769 | 3/2001 |
| WO | WO 01/16770 | 3/2001 |
| WO | WO 01/16782 | 3/2001 |
| WO | WO 01/17179 | 3/2001 |
| WO | WO 01/31856 | 5/2001 |
| WO | WO 01/48596 | 7/2001 |
| WO | WO 01/48606 | 7/2001 |
| WO | WO 01/48619 | 7/2001 |
| WO | WO 01/50247 | 7/2001 |
| WO | WO 01/50679 | 7/2001 |
| WO | WO 03/030461 | 4/2003 |

OTHER PUBLICATIONS

"10-/100-Mbps Ethernet Media Access Controller (MAC) Core", NEC, 1998, pp. 1-5.

"Enterprise Hardware, Intel Expected to Unveil New Networking Chip," News.Com, Aug. 26, 1999, <http://new.com.com/Intel+expected+to+unveil+new+networking+chip/2100-1001_3-230315.html> (accessed on Aug. 23, 2005), pp. 1-5.

"The ATM Forum Technical Committee Traffic Management Specification Version 4.1", The ATM Forum (Mar. 1999).

Agarwal et al., "April: A Processor Architecture for Multiprocessing," Proceedings of the 17th Annual International Symposium on Computer Architecutre, *IEEE*, pp. 104-114, (1990).

Beckerle, M.J., "Overview of the Start (*T) multithreaded computer" (abstract only), Publication Date: Feb. 22-26, 1993.

Byrd et al., "Multithread Processor Architectures," *IEEE Spectrum*, 32(8):38-46, New York, Aug. 1995.

Chandranmenon, G.P., et al., "Trading Packet Headers for Packet Processing", *IEEE/ACM Transactions on Networking*, 4(2):141-152, Apr. 1996.

Chappell, et al., "Simultaneous Subordinate Microthreading (SSMT)", *IEEE*, p. 186-195 (1999).

*Dictionary of Computer Words: An A to Z Guide to Today's Computers, Revised Edition*, Houghton Mifflin Company: Boston, Massachusetts, pp. 220, (1995).

*Digital Semiconductor 21140A PCI Fast Ethernet LAN Controller, Hardware Reference Manual*, Digital Equipment Corporation, pp. i-x, 1-1 through 1-5, 2-1 throught 2-12, 3-1 through 3-38, 4-31 through 5-2, 6-1 through 6-24, (Mar. 1998).

Doyle et al., *Microsoft Press Computer Dictionary*, 2nd ed., Microsoft Press, Redmond, Washington, USA, p. 326, (1994).

Farrens, et al., "Strategies for Achieving Improved Processor Throughput", *ACM*, p. 362-369 (1991).

Fillo et al., "The M-Machine Multicomputer," *IEEE Proceedings of MICRO-28*, pp. 146-156, (1995).

Frazier, Howard, "Gigabit Ethernet: From 100 to 1,000 Mbps", *IEEE Internet Computing*, pp. 24-31, (1999).

Frazier, Howard, "The 802.3z Gigabit Ethernet Standard", *IEEE Network*, pp. 6-7, (1998).

Giroux, N., et al., "Queuing and Scheduling: Quality of Service in ATM Networks, Chapter 5", *Quality of Service in ATM Networks: State-of-the-Art Traffic Management*, pp. 96-121 (1998).

Gomez et al., "Efficient Multithreaded User-Space Transport for Network Computing: Design and Test of the TRAP Protocol," *Journal of Parallel and Distributed Computing, Academic Press, Duluth, Minnesota, USA, 40(1):103-117, Jan. 1997.

Govind, et al., "Performance modeling and architecture exploration of network processors", *Quantitative Evaluation of Systems*, abstract only (1 page), Sep. 2005.

Haug et al., "Reconfigurable hardware as shared resource for parallel threads," *IEEE Symposium on FPGAs for Custom Computing Machines*, 2 pages, (1998).

Hauser et al., "Garp: a MIPS processor with a reconfigurable coprocessor," *Proceedings of the 5th Annual IEEE Symposium on Field-Programmable Custom Computing Machines*, pp. 12-21, (1997).

Hyde, R., "Overview of Memory Management," *Byte*, 13(4):219-225, (1988).

Ippoliti, A., et al., "Parallel Media Access Controller for Packet Communications at Gb/s Rates", *IEEE*, pp. 991-996, (1990).

Jenks, S., et al., "Nomadic Threads: A migrating multithread approach to remote memory accesses in multiprocessors" (abstract only), Publication Date: Oct. 20-23, 1996.

Kaiserswerth, M., "The Parallel Protocol Engine", *IEEE/ACM Transactions on Networking*, 1(6):650-663, Dec. 1993.

Khailany, B., et al., "Imagine: Media Processing with Streams," IEEE Micro, Mar.-Apr. 2001, pp. 35-46.

Leon-Garcia, A., *Communication Networks: Fundamental Concepts and Key Architectures*, McGraw-Hill Higher Education, Copyright 2000, pp. 195-198, 215-219, & 380-385.

Lim, A., et al., "Improving Performance of Adaptive Media Access Control Protocols for High-Density Wireless Networks", *Proceedings of the 1999 International Symposium on Parallel Architectures, Algorithms and Networks (ISPAN '99)*, pp. 316-321, Jun. 1999.

Litch et al., "StrongARMing Portable Communications," *IEEE Micro*, 18(2):48-55, Mar. 1998.

Mollenauer, J.F., et al., "An Efficient Media Access Control Protocol for Broadband Wireless Access Systems", *IEEE Standard, IEEE 802.16 Broadband Wireless Access Working Group*, 19 pages, Oct. 1999.

Ocheltree, K.B., et al., "A comparison of fibre channel and 802 MAC services", *Proceedings of 18th Conference on Local Computer Networks*, abstract only, 1 page, Sep. 1993.

Schmidt et al., "The Performance of Alternative Threading Architectures for Parallel Communication Subsystems," Internet Document, *Online!*, Nov. 13, 1998, pp. 1-19.

Shaw, M.C., et al., *UNIX Internals: A Systems Operations Handbook*, Windcrest Books, pp. 30-37, 1987.

Thistle et al., "A Processor Architecture for Horizon," *IEEE Proc. Supercomputing '88*, pp. 35-41, Nov. 1988.

Todorova, P., et al., "Quality-of-Service-Oriented Media Access Control for Advanced Mobile Multimedia Satellite Systems", *Proceedings of the 36th Annual Hawaii International Conference on System Sciences (HICSS'03)*, 8 pages, Jan. 2003.

Tremblay et al., "A Three Dimensional Register File for Superscalar Processors," *IEEE Proceedings of the 28th Annual Hawaii International Conference on System Sciences*, pp. 191-201, (1995).

Trimberger et al, "A time-multiplexed FPGA," *Proceedings of the 5th Annual IEEE Symposium on Field-Programmable Custom Computing Machines*, pp. 22-28, (1997).

Turner et al., "Design of a High Performance Active Router," Internet Document, *Online!*, 20 pages, Mar. 18, 1999.

Vibhatavanij et al., "Simultaneous Multithreading-Based Routers," *Proceedings of the 2000 International Conference of Parallel Processing*, Toronto, Ontario, Canada, Aug. 21-24, 2000, pp. 362-369.

Wazlowski et al., "PRSIM-II computer and architecture," *IEEE Proceedings, Workshop on FPGAs for Custom Computing Machines*, pp. 9-16, (1993).

Wikipedia entry, "Media Access Control", retrieved from http://en.wikipedia.org/wiki/Media_access_control, 2 pages, Jul. 31, 2007.

U.S. Appl. No. 09/473,571, filed Dec. 28, 1999, Wolrich et al.

U.S. Appl. No. 09/475,614, filed Dec. 30, 1999, Wolrich et al.

* cited by examiner

FLOW CONTROL IN A NETWORK ENVIRONMENT

BACKGROUND

Networking products such as routers use high-speed components for packet movement, i.e., collecting packet data from incoming network device ports and queuing the packet data for transmission to appropriate forwarding device ports. The networking products may also use high-speed special controllers for processing the packets and making forwarding decisions.

DESCRIPTION

Figure 1:
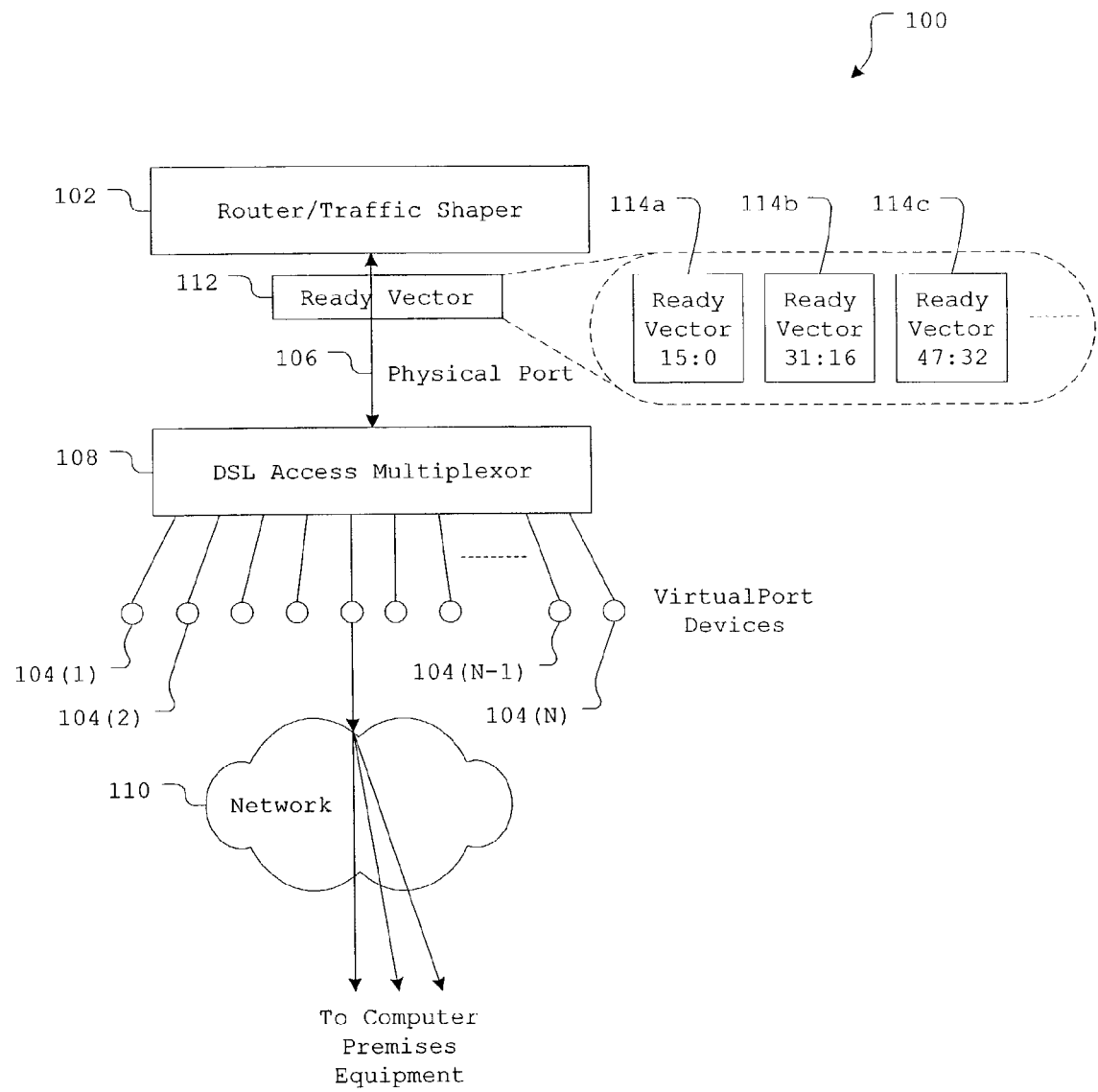
FIG. 1 is a block diagram of a network configuration.

Referring to FIG. 1, an example network configuration 100 includes a router device 102 ("router 102") that transmits network packets to multiple ports 104(1)-104(N) via a physical port 106 and a multiplexer device 108 ("multiplexer 108"). (N can represent any positive whole number; N is typically on the order of thousands). The ports 104(1)-104(N) in this example are considered "virtual ports" because they are not directly connected to the router 102, e.g., they are physically separated by another mechanism such as the multiplexer 108. The ports 104(1)-104(N) can buffer the packets for transmission through a network 110 to their respective destinations, e.g., customer premises equipment.

Each of the ports 104(1)-104(N) has a maximum bit rate at which it can accept and buffer packets. The router 102 can be configured to know the maximum bit rate of the ports 104(1)-104(N), but the router 102 may not know if any of a port's bandwidth is being used for purposes other than receiving packets from the router 102. The ports 104(1)-104(N) can be bi-directional and use bandwidth for receiving and for transmitting packets.

If the router 102 transmits packets to one of the ports 104(1)-104(N) beyond the port's maximum bit rate, then the port's buffer can overflow. Overflow can result in decreased network performance, lost packets, delayed transmission of packets, and/or other similar effects. Furthermore, as the ports 104(1)-104(N) buffer data, the available bit rates of the ports 104(1)-104(N) (the actual, real time bit rates acceptable to the ports 104(1)-104(N) without causing overflow) becomes less than their maximum bit rates. The available bit rates for each of the ports 104(1)-104(N) may unpredictably change with network conditions such as with data sent by devices other than the router 102 and buffered by the ports 104(1)-104(N) and with other bit patterns associated with the multiplexer 108.

The multiplexer 108 can provide the router 102 with information about each port's available bit rate, e.g., by assembling and sending a ready vector 112 on the physical port 106 to the router 102. The router 102 can store the ready vector 112 and read the ready vector 112 before sending data to one of the ports 104(1)-104(N). In this way, the router 102 can know to which of the ports 104(1)-104(N), if any, the router 102 may transmit packets to without causing overflow. The ready vector 112 can also inform the router 102 as to the bit rate the router 102 may use to transmit packets to different ones of the ports 104(1)-104(N).

The ready vector 112 may be a go/no-go vector including multiple bits, where each bit is associated with one of the ports 104(1)-104(N) and indicates whether that port can accept data or not. Either a "one" or a "zero" can indicate that a port has room for more data while the opposite state can indicate that the port is fully buffered and cannot accept more data without overflowing.

Alternatively, the ready vector 112 may be a rate control vector including multiple bits, where two bits are associated with each of the ports 104(1)-104(N). The two bits can indicate four encodings: zero/zero, zero/one, one/zero, and one/one. These encodings can indicate that the port associated with those bits can accept data at a faster bit rate than the current bit rate (a speed-up encoding), can accept data at the current bit rate (a constant encoding), can accept data at a slower bit rate than the current bit rate (a slow-down encoding), and cannot accept any data at all (a no-transmission encoding). The speed-up encoding, the constant encoding, the slow-down encoding, and the no-transmission encoding can each be associated with any of the four bit position encodings. For simplicity in programming, the encoding is typically the same for each of the ports 104(1)-104(N) represented in the ready vector 112, e.g., the code zero/zero always indicates speed-up.

Whether the multiplexer 108 sends the router 102 a go/no-go vector or a rate control vector, the ready vector 112 can indicate the status of multiple ports in one ready vector. For example, a 128-byte ready vector can carry up to 512 port indications using a rate control vector or up to 1024 port indications using a go/no-go vector. In this way, the amount of bandwidth used on the physical port 106 for flow control can be less than that used for sending individual flow-control messages or packets for each of the ports 104(1)-104(N).

Furthermore, the multiplexer 108 may transmit the ready vector 112 in one or more packets, the packets forming a segment. By using a packet-based ready vector, the multiplexer 108 can transmit the status for a large number of ports in one data transmission. For example, the ready vector may include segments 114a, 114b, 114c, etc., each segment including (in this example) sixteen bits of information that may be transmitted as one or more packets or frames. The multiplexer 108 may assemble the ready vector 112 based on information (typically header information) included with the segments 114a, 114b, 114c, etc. indicating the proper order of the segments.

Figure 2:
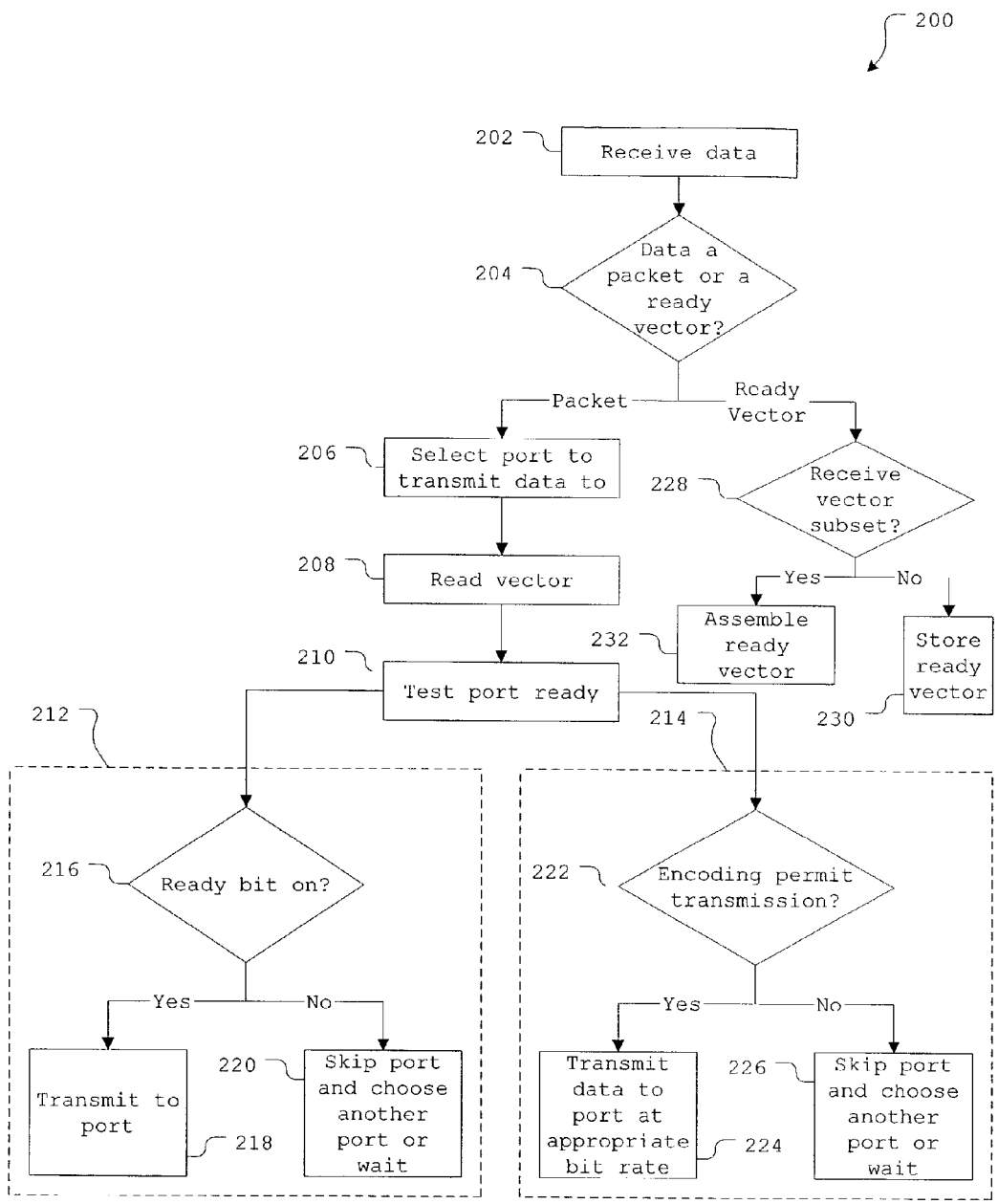
FIG. 2 is a flowchart illustrating a process of flow control.

Referring to FIG. 2, a flow control process 200 is an example of using the ready vector 112 to control flow of data to the ports 104(1)-104(N). Although the flow control process 200 is described with reference to the elements included in the network configuration 100 of FIG. 1, this or a similar process may be performed in another, similar network configuration including the same or similar elements.

In the flow control process 200, the router 102 receives data at block 202 on the physical port 106 from the multiplexer 108. On the physical port 106, the router 102 can receive both ordinary data packets for routing to one of the ports 104(1)-104(N) and ready vectors. Thus, an encapsulation at the front of the data includes a bit that specifies whether the data received by the router 102 includes ordinary packet data or a ready vector by using a "one" for one type of data and a "zero" for the other. The data received by the router 102 could otherwise be identified, e.g., by another encapsulation or header technique, by sending different types of data on different communication links between the router 102 and the multiplexer 108, or by another similar technique.

The router 102 determines at block 204 what type of data it received from the multiplexer 108, e.g., by reading the encapsulation bit. If the data includes a ready vector, then the router 102 handles the data as explained further below.

If the data includes packet data, then the router 102 selects at block 206 one of the ports 104(1)-104(N) for data transmission. The router 102 chooses one of the ports 104(1)-104(N) based on any routing technique. For example, the router 102 may look up a next-hop destination of the packet in a router look-up table included in or accessible to the router 102 and select one of the ports 104(1)-104(N) that services that destination. In this example, assume that the router 102 selects the first port, port 104(1) ("selected port 104").

The router 102 also reads at block 208 the ready vector 112, or part of the ready vector 112, from a previous test of received data. The router 102 uses the ready vector 112 to determine whether and/or how to transmit the packet to the selected port 104. (That is, the router 102 previously received the ready vector 112 and stored it locally or in an accessible storage mechanism, as described further below.) The router 102 may read the ready vector 112 a certain number of bits at a time. In this example, the router 102 can read thirty-two bits of the ready vector 112 at a time, which corresponds to reading information for thirty-two ports (for a go/no-go ready vector) or for sixteen ports (for a rate control ready vector) at a time.

One way that the router 102 may access the part of the ready vector 112 that includes information on the selected port 104 includes reading thirty-two bits of the ready vector 112 at a base storage address of the ready vector 112 plus the port number of the selected port 104 shifted by five. In this way, the router can obtain a ready vector for thirty-two ports, including the selected port 104.

The router 102 may not read the ready vector 112 after every received packet but rather at a certain rate. The rate at which the router 102 reads the ready vector 112 may depend on a response requirement in transmitting the packets to the ports 104(1)-104(N).

For example, if transmission of data from the router 102 to the multiplexer 108 occurs every fifty cycles, it takes the router 102 sixteen hundred cycles to transmit data to thirty-two ports. If a cycle time equals five nanoseconds, then such transmission can incur a latency of eight microseconds (us). Accounting for reading and, if necessary, assembling the ready vector 112 and for gating data for transmission to the multiplexer 108, this latency could increase from 8 us to 10 us. Adding network latency to this 10 us provides the total bit response latency. Multiplying the total bit response latency by the port rate results in the buffering needed at the ports 104(1)-104(N). This computation may be run in reverse order: given a fixed buffering at the ports 104(1)-104(N), the router 102 can calculate the required ready bit response latency, subtract the network latency, and calculate the number of port ready bits needed to read in one cycle.

For simplicity in this example, assume that the router 102 reads the ready vector 112 after receiving each packet received from the multiplexer 108.

From the ready vector 112 (or the part of the ready vector 112 read that includes information on the selected port 104), the router 102 tests at block 210 the ready vector 112 to determine the readiness of the selected port 104 to receive data from the router 102. If the ready vector 112 is a go/no-go vector, then the router 102 performs a go/no-go process 212, while if the ready vector 112 is a rate control vector, then the router 102 performs a rate control process 214.

In the go/no-go process 212, the router 102 determines if the router 102 may transmit data to the selected port 104 by checking the bit included in the ready vector 112 that corresponds to the selected port 104. The router 102 determines at block 216 if the selected port's ready bit is on or off. Typically, a "one" indicates that a port is on and can accept data while a "zero" indicates that a port is off and cannot accept any more data without overflowing.

If the selected port 104 is on, then the router 102 transmits at block 218 the packet to the selected port 104. Generally, a port is "on" or "off" depending on the one or zero bit state associated with the selected port in the ready vector 112 where one state corresponds to on and the other state corresponds to off. If the selected port 104 is off, then the router 102 skips at block 220 the selected port, either selecting another one of the ports 104(1)-104(N) to transmit the packet to or waiting to transmit the packet to the selected port 104 until a later time, e.g., after a subsequent check of the ready vector 112 reveals that the selected port 104 is on.

Another way that the router 102 may determine if the ready bit for the selected port 104 is on or off includes performing a logic operation on bits of the ready vector 112. In one example, the router 102 performs a logical AND operation on the thirty-two bit ready vector 112 (where a "one" indicates that a port is on) read from storage and a thirty-two bit string of ones. Every "one" in the resulting bit string indicates that the port associated with that bit position can accept data. In this way, the router 102 can identify on and off positions for multiple ports with one operation. The operation may be more efficient than individually checking each bit included in the ready vector 112.

In the rate control process 214, the router 102 determines at block 222 from the ready vector 112 (or a portion of the ready vector 112) if the encoding for the selected port 104 indicates permissibility of transmission to the selected port 104 and, if so, what bit rate to use in the transmission. If the ready vector 112 includes a speed-up encoding, a constant encoding, or a slow-down encoding for the selected bit 104, then the selected port 104 can accept data. The router 102 transmits at block 224 the packet to the selected port 104 at the bit rate indicated by the encoding.

More specifically, the router 102 may increase the current bit rate (for speed-up encoding) or decrease the current bit rate (for slow-down encoding) by a fixed amount or by an amount determined on the fly (e.g., in real time). For example, if the encoding indicates speed-up encoding, then the router 102 can transmit data to the selected port 104 at an "x+1" rate. For every "x" transmissions to the selected port 104, the router 102 can perform another transmission to the selected port 104. Similarly, if the encoding indicates slow-down encoding, then the router 102 can transmit data to the selected port 104 at an "x−−1" rate where for every "x" transmissions to the selected port 104, the router 102 can skip the selected port 104 for transmission one time. (In these examples, "x" represents any positive whole number.)

If the selected port 104 indicates no-transmission encoding, then the selected port 104 cannot accept any more data without possibly overflowing the port buffer, so the router 102 skips at block 226 the selected port 104. The router 102 may select another one of the ports 104(1)-104(N) or wait as described above.

If the router 102 determines at block 204 that the data it received from the multiplexer 108 includes a ready vector, then the router 102 determines 228 if it received a vector subset. A vector subset is, for example, a portion of the ready vector 112 that includes information for some but not all of the ports 104(1)-104(N). The router 102 may store vector subsets differently than a full ready vector.

If the router 102 did not receive a vector subset, then the router 102 stores 230 the received ready vector 112 at a storage location. The storage location may be internal to the router 102, e.g., include temporary or local memory such as a memory cache, a collection of data such as a database, random access memory (RAM), or other similar memory mechanism, or otherwise be accessible to the router 102, e.g., include a collection of data such as a database, a fast memory mechanism such as static RAM (SRAM), a memory cache, or other similar memory mechanisms. The router 102 may then read the ready vector 112 from this storage location as necessary.

If the router 102 did receive a vector subset, then the router 102 assembles 232 the vector subset with other vector subsets. This assembling can include storing the vector subset at a storage location so that the vector subset is stored at an address contiguous to an address including other vector subsets at the storage location that make up the ready vector 112.

Including a segment index with the ready vector 112 sent by the multiplexer 108 to the router 102 can help the router 102 assemble the vector subsets in correct contiguous order. For example, if a full ready vector includes 512 bits, each vector subset sent by the multiplexer 108 could include thirty-six bits: a four bit segment index and a thirty-two bit vector subset. The segment index can indicate the position of the vector subset in the sixteen vector subsets included in the full ready vector, from first (bit indicator 0000) to sixteenth (bit indicator 1111). Using the segment index may be particularly helpful if the router 102 receives vector subsets out of order, i.e., receives a vector subset for bits thirty-three to sixty-four before a vector subset for bits one to thirty-two.

The router 102 may include mechanisms configured to aid in the receipt and transmission of packets. One mechanism can receive, assemble, and classify packets from the multiplexer 108 while the other can transmit the packets to the multiplexer 108 after the router 102 has selected one of the ports 104(1)-104(N).

Figure 3:
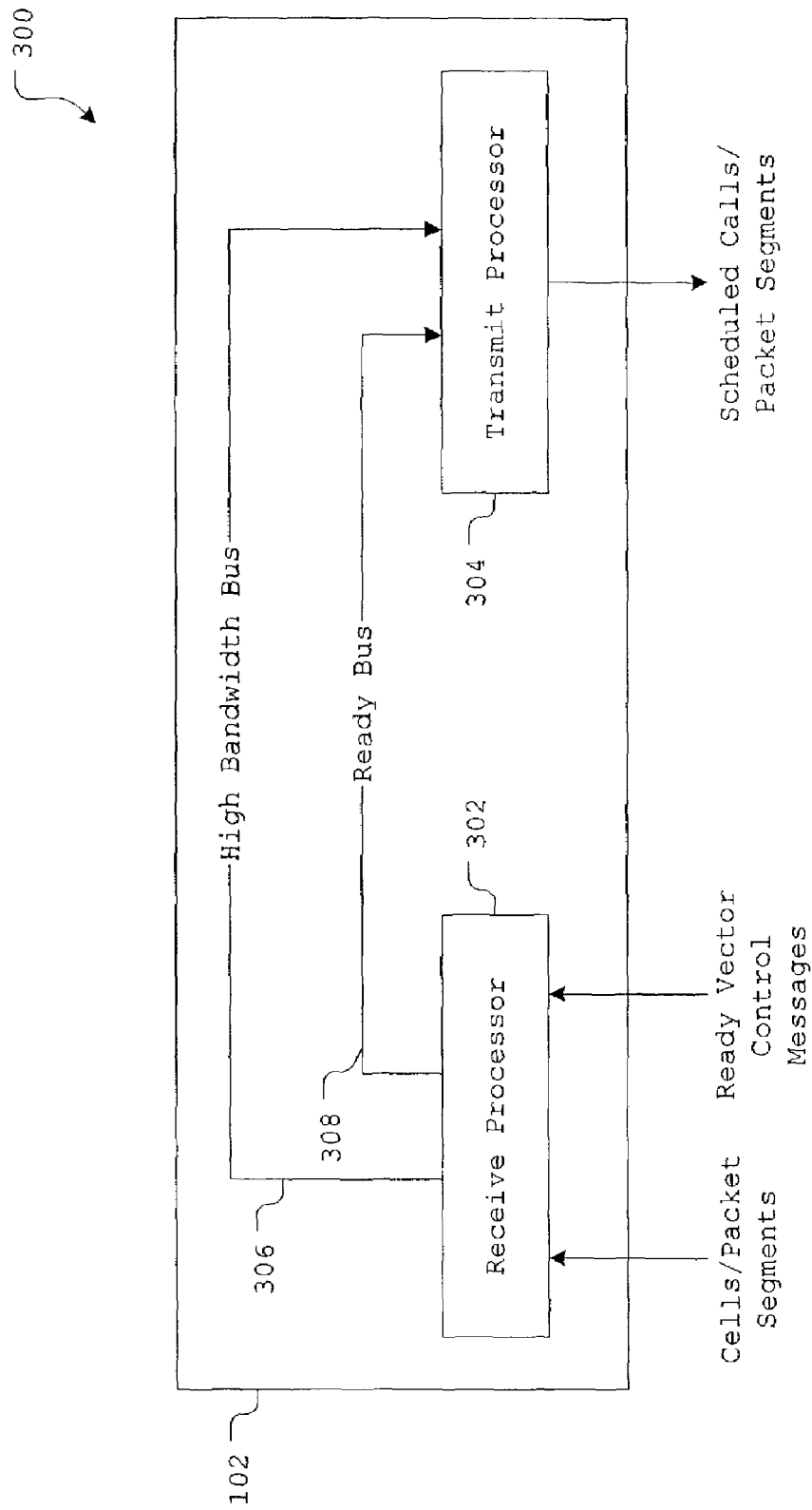
FIG. 3 is a block diagram of a dual chip router.

Referring to FIG. 3, in an example router setup 300, the router 102 is set up as a dual-chip router/shaper including a receive processor 302 and a transmit processor 304. Generally, the receive processor 302 handles packet assembly and classification while the transmit processor 304 handles packet transmission and shaping.

The router 102 receives data, e.g., packets and ready vectors from the multiplexer 108 (see FIG. 1), at the receive processor 302. Upon receiving and identifying a ready vector, the receive processor 302 transmits the ready vector to the transmit processor 304 over an inter-chip high bandwidth bus 306 or over a dedicated ready bus 308.

The receive processor 304 and the transmit processor 304 may use an arbitration system in receiving and transmitting packets that include the ready vector to and from ports such that receiving and/or transmitting may be decided with arbitration, such as through a round robin technique, priority queuing, weighted fair queuing, or other similar type of arbitration technique. In another example, the receive processor 304 and the transmit processor 304 may receive and/or transmit packets to and from the ports based on service rates and maximum port rates. Examples of service rates include constant bit rate (CBR), real-time and non-real-time variable bit rate (rt-VBR and nrt-VBR, respectively), unspecified bit rate (UBR), and other similar types of rates.

The router 102 may include both the inter-chip high bandwidth bus 306 and the dedicated ready bus 308 or the router 102 may include only one of the buses 306, 308. The receive processor 302 may transmit ready vectors to the transmit processor 304 as individual ready vectors or as an assembled ready vector. Sending an assembled ready vector to the transmit processor 304 may enable the transmit processor 304 to more efficiently locate information for particular packet destinations, e.g., ports.

Upon receiving and identifying a packet, the receive processor 302 assembles the packet with other packets included in the same packet stream (if the packet is a packet segment) and classifies the packet. Classifying the packet can include identifying transmission requirements for the packet, such as Quality of Service (QoS) terms, necessary bandwidth, etc. The receive processor 302 transmits the packet (alone or as part of an assembled packet stream) and any associated classification information to the transmit processor 304 on the high bandwidth bus 306 or on the ready bus 308. Typically, the receive processor 302 transmits ready vectors and packets to the transmit processor 304 on the same bus.

The transmit processor 304 can receive ready vectors and packets on the high bandwidth bus 306 and/or the ready bus 308. The transmit processor 304 determines where and how to transmit the packets, e.g., as described in the flow control process 200 (see FIG. 2), and transmits the packets to their appropriate destinations.

Figure 4:
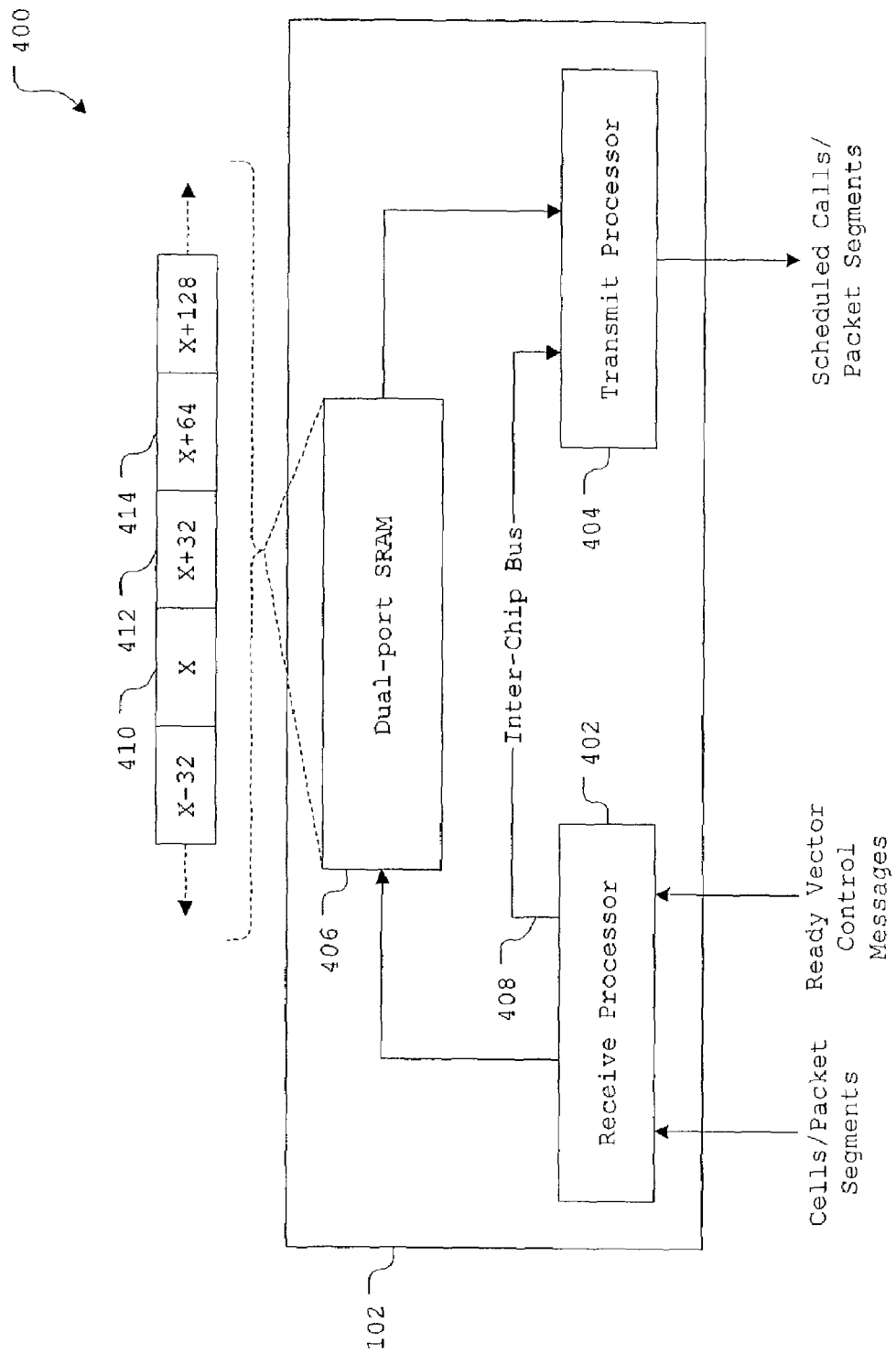
FIG. 4 is a block diagram of a dual chip router including shared memory.

Referring to FIG. 4, another example router setup 400 illustrates how the router 102 may be set up to receive and transmit data. The router 102 in this example is set up as a dual-chip router/shaper with shared SRAM including a receive processor 402, a transmit processor 404, and a dual-port SRAM 406. The receive processor 402 and the transmit processor 404 generally function as like-named processors described above with reference to the example router setup 300 (see FIG. 3).

The receive processor 402 receives and identifies ready vectors and packets and transmits them to the transmit processor 404 or to the dual-port SRAM 406. The receive processor 402 transmits packets (and any associated classification information) to the transmit processor 404 on an inter-chip bus 408.

The receive processor 402 transmits ready vectors to the dual-port SRAM 406 either as assembled vector arrays or as individual ready vectors (vector subsets). If the receive processor 402 transmits individual ready vectors, the receive processor 402 may transmit the individual ready vectors for storage at particular storage locations in the dual-port SRAM 406 so that the dual-port SRAM 406 consecutively stores ready vectors, e.g., the ready vector for bits one to thirty-two at location X 410, the ready vector for bits thirty-three to sixty-four at location X plus thirty-two bits 412, the ready vector for bits sixty-five to ninety-six at location X plus sixty-four bits 414, etc. Such consecutive storage can help the transmit processor 404 more efficiently locate information for particular packet destinations.

The dual-port SRAM 406 stores the ready vectors, and the transmit processor 404 reads the ready vectors from the dual-port SRAM 406. The transmit processor 404 can use data from the ready vectors in determining where and how to transmit packets.

Figure 5:
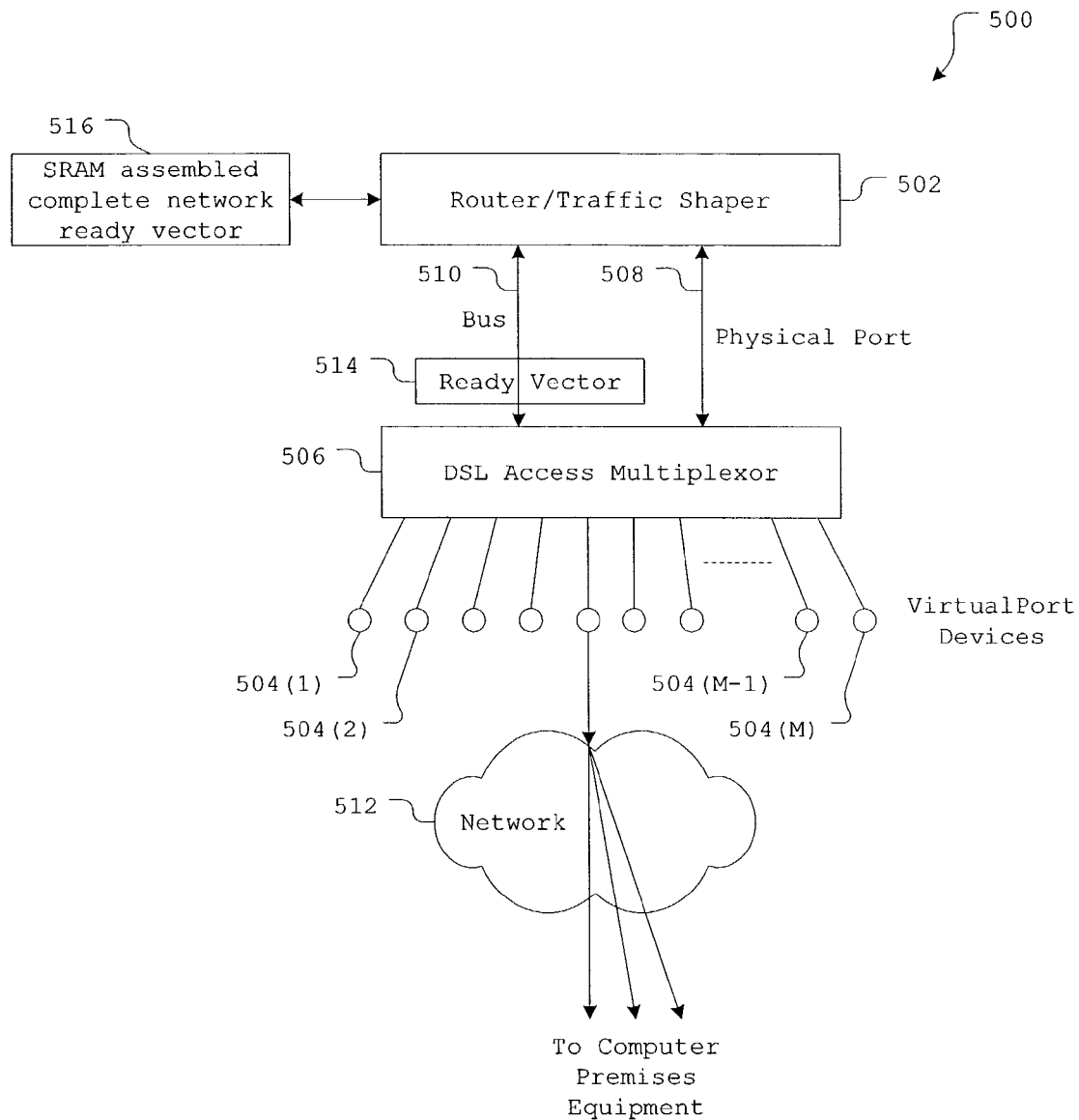
FIG. 5 is a block diagram of an alternate network configuration.

Referring to FIG. 5, another example network configuration 500 includes a router device 502 ("router 502") that can transmit packets to multiple ports 504(1)-504(M) via a multiplexer device 506 ("multiplexer 506") and a physical port 508 and/or a sideband (out-of-band) bus 510 ("ready bus 510"). (M can represent any positive whole number; M is typically on the order of thousands). The ready bus 510 typically has less bandwidth than the physical port 508 and is used primarily or exclusively for transmission of control messages between the router 502 and devices such as the multiplexer 506. The ports 504(1)-504(N) can buffer the packets for transmission through a network 512 to their respective destinations, e.g., customer premises equipment. The router 502, the ports 504(1)-504(N), the multiplexer 506, the physical port 508, and the network 512 can be implemented as described above with reference to like-named elements included in FIG. 1 and elements described with reference to FIG. 5 may be similarly implemented for like-named elements in FIG. 1. The ready bus 510 may serve as the ready bus 308 of FIG. 3.

In the network configuration 500, the multiplexer 506 can transmit a ready vector 514 on the ready bus 510. The ready vector 514 can be implemented as described for the ready vector 112 of FIG. 1. The multiplexer 506 may also transmit ready vectors to the router 502 using the physical port 508. For simplicity in this example, assume that the multiplexer 506 transmits all ready vectors on the ready bus 510.

The router 502 periodically reads the ready bus 510, by issuing select signals (not shown) to the multiplexer 506 in response to fetching data, such as by executing a get command. In response to the select signals, the multiplexer 506 returns the ready vector 514 from a selected one of the ports 504(1)-504(M) to the router 502 over the ready bus 510. The ready vector 514 may include a full ready vector or multiple sixteen-bit ready vector subsets (although the subsets may be of any bit size).

If the multiplexer 506 transmits vector subsets, after a series of get commands and multiplexer responses, the router 502 can receive all of the ready bits for a full ready vector. For example, if M equals 256, there are 256 ports 504(1)-504(256), and sixteen get commands would return all ready bits if each get command response sends sixteen bits of data on the ready bus 510 from the multiplexer 506 to the router 502. Typically, the multiplexer 506 sends consecutive vector subsets, e.g., a vector subset for bits one to thirty-two, then for bits thirty-three to sixty-four, etc., although vector subsets may be transmitted and/or received out of sequence.

Furthermore, the reading sequence on the ready bus 510 typically repeats. After the router 502 issues get commands for the full ready vector, the router 502 typically issues a get command starting over with bits for the first port or ports 504(1)-504(M), e.g., after issuing a get command for bits 251-256 of a 256 bit ready vector, the next get command would be for bits one to sixteen.

After receiving and assembling the ready vector 514, the router 502 can write the ready vector 514 to SRAM 516. The SRAM 516 may serve as the dual-port SRAM 406 of FIG. 4.

The elements described with reference to FIGS. 1-5 can be implemented in a variety of ways.

The routers 102 and 502 can each include a device capable of directing information to and/or from the physical ports 106 and 508, respectively. Examples of the routers 102 and 502 include devices capable of forwarding network traffic and/or making decisions on where to send network traffic on its way to its destination such as router devices, traffic shapers, combination router and traffic shapers, and other similar devices.

The ports 104(1)-104(N) and 504(1)-504(M) can each include any mechanism capable of accepting and buffering data for transmission to another mechanism or device. Examples of the ports 104(1)-104(N) and 504(1)-504(M) include sockets, logical channels, channel endpoints, and other similar mechanisms.

The networks 110 and 512 can each include any kind and any combination of networks such as an Internet, a local area network (LAN), a wide area network (WAN), a private network, a public network, or other similar network. The networks 110 and 512 may each include a LAN set up as an Ethernet. Examples of an Ethernet include a 10BaseT Ethernet, a Fast Ethernet, a Gigabit Ethernet, a ten Gigabit Ethernet, and other similar faster and slower Ethernets. A 10BaseT Ethernet generally refers to an Ethernet setup that transmits information at ten Megabits per second (Mbps). A Fast Ethernet generally refers to an Ethernet setup using a 100BaseT Ethernet, also called the Fast Ethernet standard (Institute of Electrical and Electronics Engineers (IEEE) standard 802.3u, adopted 1995), that transmits information at one hundred Mbps. A Gigabit Ethernet generally refers to an Ethernet setup that transmits information at 1000 Mbps using IEEE standard 802.3z (adopted 1998). A ten Gigabit Ethernet generally refers to an Ethernet setup that transmits information ten times as fast as a Gigabit Ethernet using IEEE standard 802.3ae (first draft adopted 2000).

The multiplexers 108 and 506 can each include any device capable of combining multiple transmissions into a single transmission and/or vice versa. The multiplexers 108 and 506 are shown as digital subscriber links access multiplexers (DSLAM), but other similar devices (with or without DSL capabilities) may be used.

The dual-port SRAM 406 and the SRAM 516 can each include any memory mechanism capable of storing data, usually at a relatively fast access rate, without needing to be refreshed.

Information transmitted between elements may be transmitted as blocks of data generally referred to as packets. The unit of packet data could include an entire network packet (e.g., an Ethernet packet) or a portion of such a packet. The packets may have a variable or a fixed size. Packets with a fixed size are called cells. Each sent packet may be part of a packet stream, where each of the packets, called a segment, included in the packet stream fits together to form a contiguous stream of data.

Data can be communicated between elements on communication links. The communication links can include any kind and any combination of communication links such as buses, physical ports, modem links, Ethernet links, cables, point-to-point links, infrared connections, fiber optic links, wireless links, cellular links, Bluetooth, satellite links, and other similar links. Additionally, each of the communication links may include one or more individual communication links. For bus communication links, the buses can have any width, e.g., sixteen bits, thirty-two bits, sixty-four bits, etc, and may run at any speed, e.g., thirty-three Mega Hertz (MHz), 100 MHz, etc. A bus may have a sideband feature in which the bus includes parallel channels that can each simultaneously carry data and/or address information.

Furthermore, the network configurations 100 and 500 are simplified for ease of explanation. The network configurations 100 and 500 may each include more or fewer additional elements such as networks, communication links, proxy servers, hubs, bridges, switches, routers, processors, storage locations, firewalls or other security mechanisms, Internet Service Providers (ISPs), and other elements.

The techniques described here are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program may be implemented in a high level procedural or object oriented programming language to communicate with a machine system. However, the programs can be implemented in assembly or machine language, if desired. In any case, the language may be a compiled or interpreted language.

Each such program may be stored on a storage medium or device, e.g., compact disc read only memory (CD-ROM), hard disk, magnetic diskette, or similar medium or device, that is readable by a general or special purpose programmable machine for configuring and operating the machine when the storage medium or device is read by the computer to perform the procedures described in this document. The system may also be considered to be implemented as a machine-readable storage medium, configured with a program, where the storage medium so configured causes a machine to operate in a specific and predefined manner.

Furthermore, elements of the processes presented may be executed in a different order than that shown to produce an acceptable result.

Other embodiments are within the scope of the following claims.

What is claimed is:

1. A method for providing flow control comprising:
   receiving multiple vectors at a router, each of the multiple vectors comprising an indication of an availability of a collection of multiple ports not directly connected to the router to receive data from the router;
   assembling the multiple vectors into a composite; and
   controlling transmission of data from the router to the multiple ports based at least on the composite.

2. The method of claim 1 further comprising transmitting data from the multiple ports to a network.

3. The method of claim 1 further comprising storing the indication at a storage location.

4. The method of claim 1 further comprising transmitting data from the router to one of the multiple ports if the indication indicates that the one of the multiple ports can accept data.

5. The method of claim 1 further comprising changing a rate of data transmission to the multiple ports based on at least the indication.

6. The method of claim 1 in which the indication includes bits indicating whether or not the multiple ports include can accept data.

7. The method of claim 1 further comprising
   receiving at the router an additional indication of the availability of additional ports to accept data from the router, and
   controlling transmission of data from the router to the additional ports based at least on the additional indication.

8. The method of claim 7 further comprising storing the additional indication at a storage location address contiguous to another storage location address that stores the indication.

9. The method of claim 1 further comprising receiving the indication at the router on a physical port from a device having access to the multiple ports.

10. The method of claim 1 further comprising receiving the indication at the router on a sideband bus from a device having access to the multiple ports.

11. The method of claim 1 further comprising receiving the indication at the router from a Digital Subscriber Line Access Multiplexer having access to the multiple ports.

12. The method of claim 1 in which the data includes a packet.

13. The method of claim 1 in which the multiple ports comprise virtual ports.

14. An article for providing flow control, the article including a machine readable medium having machine executable instructions, the instructions when executed by a machine causing the machine to perform operations comprising:
   receiving at a router a first indication of an availability of each one of a first collection of multiple ports that are not directly connected to the router to receive data from the router;
   receiving at the router a second indication of an availability of each one of a second collection of multiple ports that are not directly connected to the router to receive data from the router;
   storing the first indication and the second indication at contiguous storage location addresses; and
   controlling transmission of data from the router to the first collection of multiple ports based at least on the first indication and to the second collection of multiple ports based at least on the second indication.

15. The article of claim 14 further comprising transmitting data from the multiple ports to a network.

16. The article of claim 14 further comprising storing the indication at a storage location.

17. The article of claim 14 further comprising transmitting data from the router to one of the multiple ports if the indication indicates that the one of the multiple ports can accept data.

18. The article of claim 14 further comprising changing a rate of data transmission to the multiple ports based on at least the indication.

19. The article of claim 14 in which the indication includes bits indicating whether or not the multiple ports include can accept data.

20. The article of claim 14 further comprising receiving the indication at the router on a physical port from a device having access to the multiple ports.

21. The article of claim 14 further comprising receiving the indication at the router on a sideband bus from a device having access to the multiple ports.

22. The article of claim 14 further comprising receiving the indication at the router from a Digital Subscriber Line Access Multiplexer having access to the multiple ports.

23. The article of claim 14 further comprising
   receiving multiple vectors at the router, each of the multiple vectors indicating the availability of a subset of the multiple ports to receive data from the router;
   assembling the multiple vectors into one vector; and
   using the one vector to control transmission of data from the router to the multiple ports.

24. The article of claim 14 in which the data includes a packet.

25. The article of claim 14 in which the multiple ports comprise virtual ports.

26. A system for providing flow control comprising:
   a device configured to provide multiple ports, each configured to transmit data to a network; and
   a router not directly connected to the multiple ports and configured to receive separate indications of an availability of each of the multiple ports to accept data from the router and configured to control transmission of information from the router to the multiple ports based at least on the indication, wherein the router includes a memory mechanism that is accessible by the router and configured to store the indication.

27. The system of claim 26 in which the device includes a Digital Subscriber Line Access Multiplexer.

28. The system of claim 26 in which the memory mechanism includes a fast memory mechanism accessible by the router.

29. The system of claim 26 in which the multiple ports comprise virtual ports.

30. An apparatus for providing flow control comprising:
a receiver processor configured to receive separate indications of an availability of each one of multiple ports not directly connected to the apparatus to accept data from the apparatus;
a transmitter processor configured to control transmission of data from the apparatus to the multiple ports based at least on the indication;
a memory mechanism accessible to the receiver processor and to the transmitter processor and configured to store the indication; and
a bus capable of carrying information between the receiver processor and the transmitter processor.

31. The apparatus of claim 30 in which the transmitter processor is also configured to retrieve information about the indication from the memory mechanism and to use the information in controlling transmission of data from the apparatus to multiple ports.

32. The apparatus of claim 30 in which the memory mechanism includes static random access memory.

33. The apparatus of claim 30 in which the receiver processor is also configured to receive multiple indicators, each of the multiple indicators indicating the availability of a subset of the multiple ports to accept data from the apparatus, and to assemble the multiple indicators to form the indication.

34. The apparatus of claim 30 in which the bus includes a high bandwidth bus internal to the apparatus.

35. The apparatus of claim 30 in which the receiver processor is also configured to receive a packet and the transmitter processor is also configured to determine which one of the multiple ports to transmit the packet to based at least on the indication.

36. The apparatus of claim 30 further comprising a microengine configured to execute program threads, the threads implementing the receiver processor and the transmitter processor.

37. The apparatus of claim 30 in which the multiple ports comprise virtual ports.

38. An apparatus comprising:
a receiver processor configured to receive multiple indicators and to assemble the multiple indicators to form an indication of an availability of each one of multiple ports to accept data from the apparatus, wherein
each of the multiple indicators indicates the availability of a subset of the multiple ports to accept data from the apparatus, and
each of the multiple ports is not directly connected to the apparatus.

39. The apparatus of claim 38 in which the multiple ports comprise virtual ports.

40. An apparatus comprising:
a transmitter processor configured to
control transmission of data from the apparatus to each one of multiple ports based at least on separate indications of an availability of each one of the multiple ports to accept data from the apparatus,
retrieve information about the indication from a memory mechanism, and
use the information in controlling transmission of data from the apparatus to the multiple ports,
wherein the multiple ports are not directly connected to the apparatus.

41. The apparatus of claim 40 in which the multiple ports comprise virtual ports.

42. A method for providing flow control comprising:
receiving, at a router on a sideband bus from a device having access to the multiple ports, separate indications of an availability of each one of multiple ports not directly connected to the router to receive data from the router; and
controlling transmission of data from the router to the multiple ports based at least on the indication.

43. The method of claim 42 in which the multiple ports comprise virtual ports.

44. A method for providing flow control comprising:
receiving at a router a first indication of an availability of each one of a first collection of multiple ports that are not directly connected to the router to receive data from the router;
receiving at the router a second indication of an availability of each one of a second collection of multiple ports that are not directly connected to the router to receive data from the router;
storing the first indication and the second indication at contiguous storage location addresses; and
controlling transmission of data from the router to the first collection of multiple ports based at least on the first indication and to the second collection of multiple ports based at least on the second indication.

45. The method of claim 44 in which the multiple ports comprise virtual ports.

46. An article for providing flow control, the article including a machine-readable medium having machine-executable instructions, the instructions when executed by a machine causing the machine to perform operations comprising:
receiving at a router multiple vectors each indicating an availability of a different collection of multiple ports not directly connected to the router to receive data from the router;
assembling the multiple vectors into a composite; and
controlling transmission of data from the router to the multiple ports based at least on the composite.

47. The article of claim 46 in which the multiple ports comprise virtual ports.

48. An apparatus for providing flow control comprising:
a receiver processor configured to receive a data packet and separate indicators of an availability of each one of multiple ports not directly connected to the apparatus to accept data from the apparatus;
a transmitter processor configured to determine which one of the multiple ports to transmit the packet to based at least on the indication; and
a bus capable of carrying information between the receiver processor and the transmitter processor.

49. The apparatus of claim 48 in which the multiple ports comprise virtual ports.

50. An apparatus for providing flow control comprising:
a microengine configured to execute program threads, the threads implementing a receiver processor and a transmitter processor, wherein the receiver processor is configured to receive separate indications of an availability of each one of multiple ports not directly connected to the apparatus to accept data from the apparatus and the transmitter processor is configured to control transmission of data from the apparatus to the multiple ports based at least on the indication.

51. The apparatus of claim 50 in which the multiple ports comprise virtual ports.

52. An apparatus for providing flow control comprising:
a collection of bi-directional virtual ports;
a router comprising
  a receive processor comprising one or more inputs to receive data packets and control message packets,
  a transmit processor configured to handle packet transmission over a physical output port based at least in part on an availability of each of the bi-directional virtual ports to receive data from the router, and
  a memory accessible to the receive processor and to the transmit processor and configured to store one or more indications of the availability of each of the bi-directional virtual ports; and
an access multiplexer configured to receive packets transmitted by the transmit processor over the physical output port and to convey, to the receive processor in a control message packet, one or more indications of the availability of the bi-directional virtual ports in the collection,
wherein the router is not directly connected to the collection of the bi-directional virtual ports.

* * * * *